United States Patent [19]

Suda et al.

[11] Patent Number: 4,595,271

[45] Date of Patent: Jun. 17, 1986

[54] IN-FOCUS STATE DETECTION DEVICE

[75] Inventors: Shigeyuki Suda, Tokyo; Yukichi Niwa, Narashino; Yasuo Ogino; Mitsutoshi Ohwada, both of Yokohama, all of Japan

[73] Assignee: Canon Kabushiki Kaisha, Tokyo, Japan

[21] Appl. No.: 665,982

[22] Filed: Oct. 29, 1984

[30] Foreign Application Priority Data

Nov. 5, 1983 [JP] Japan .................................. 58-207978

[51] Int. Cl.⁴ ............................ G03B 3/00; G01J 1/20
[52] U.S. Cl. ....................... 354/403; 250/201
[58] Field of Search ................. 354/402–409; 356/1; 250/201 AF, 204; 350/507, 518, 521, 530

[56] References Cited

U.S. PATENT DOCUMENTS

| 4,357,085 | 11/1982 | Niwa et al. | 354/403 |
| 4,473,287 | 9/1984 | Fukuhara et al. | 354/402 X |
| 4,483,602 | 11/1984 | Aoki et al. | 354/402 |
| 4,504,135 | 3/1985 | Kawabata | 354/402 |

FOREIGN PATENT DOCUMENTS

| 2420731 | 11/1975 | Fed. Rep. of Germany | 354/403 |
| 57-22210 | 2/1982 | Japan . | |
| 57-58110 | 4/1982 | Japan . | |
| 7111 | 1/1983 | Japan | 354/408 |

Primary Examiner—William B. Perkey
Attorney, Agent, or Firm—Fitzpatrick, Cella, Harper & Scinto

[57] ABSTRACT

An in-focus state detection device having a light source for emitting a near-infrared light for detecting an in-focus state of an object lens by sensing the light of the light source reflected by an object by a sensor through the object lens is disclosed. The in-focus state of the object lens to a visible light is exactly detected by correcting a relation between the light of the light source transmitted through the object lens and the sensor in accordance with a change in chromatic aberration information of the object lens to the light of the light source.

18 Claims, 18 Drawing Figures

IN-FOCUS STATE DETECTION DEVICE

BACKGROUND OF THE INVENTION

1. Field of the Invention

The present invention relates to an in-focus state detection device for detecting an in-focus state of an object lens by sensing a non-visual light of a light source reflected by an object by a sensor through the object lens, and more particularly to an in-focus state detection device of a TTL-active type which is suitable for use in a one-eye reflex type camera or a microscope having an exchangeable object lens.

2. Description of the Prior Art

The in-focus state detection device of this type has been well known, such as by U.S. Pat. No. 4,357,085 issued on Nov. 2, 1982. An optical system to which this device is applied is also proposed by Japanese Patent Application Laid-Open No. 22210/1982 laid open on Feb. 5, 1982 and Japanese Patent Application Laid-Open No. 58110/1982 laid open on Apr. 7, 1982.

In this type of device, a sensor has its photosensing area divided into two sub-areas, and a light source, an object surface and boundaries of the photosensing sub-areas of the sensor are in a conjugate relation when an object lens is in an in-focus state so that the in-focus state of the object lens is detected by a difference between outputs of the photosensing sub-areas of the sensor. However, since this type of device usually uses a light source which emits a near infrared light, the in-focus state for a visible light used for photographing or viewing is not detected if a chromatic aberration of the object lens in the near infrared light is different from that of the object lens in the visual light. This is highly inconvenient when the device is used in a one-eye reflex type camera or a microscope having an exchangeable object lens.

Figure 1A:
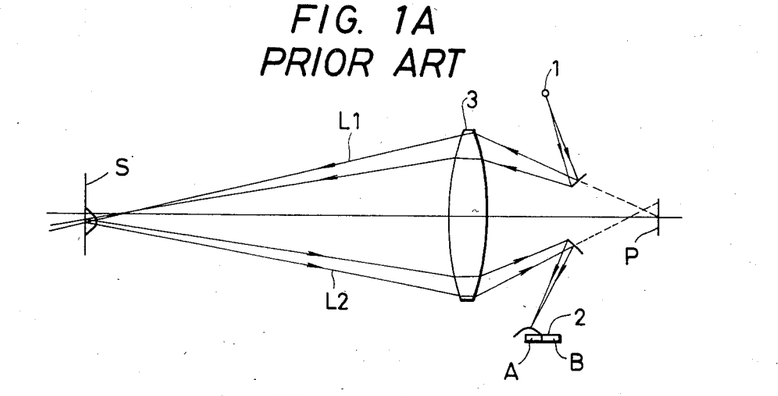
FIGS. 1A, 1B and 1C show a conventional TTL-active type in-focus state detection device.
Figure 1B:
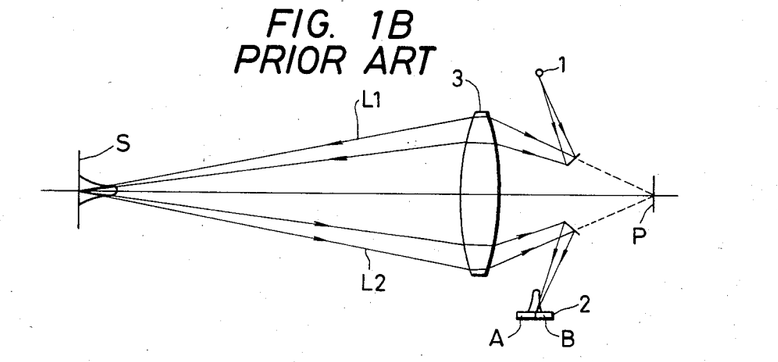
Figure 1C:
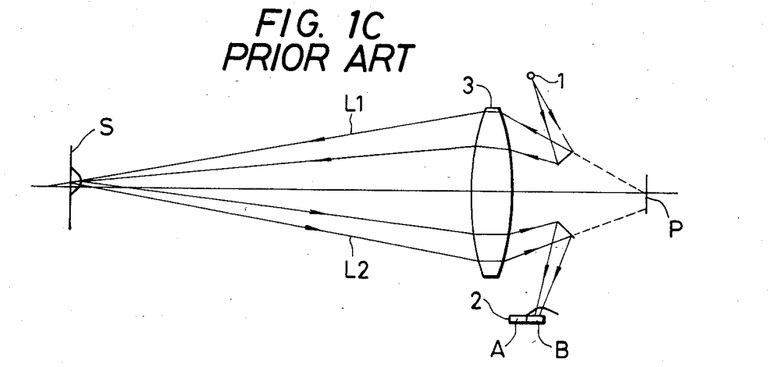

FIGS. 1A, 1B and 1C show schematic constructions of a conventional TTL active type in-focus state detection device. FIG. 1A shows a near focus state, FIG. 1B shows an in-focus state and FIG. 1C shows a far focus state. Basically, a light source 1 which emits a near infrared light and a two-split sensor 2 are arranged at equivalent positions to an anticipated focusing plane P around an optical axis of an object lens 3, and a light flux L1 omitted from the light source 1 is projected to an object plane S through a predetermined aperture of the object lens 3. A light flux L2 reflected by the object plane S is sensed by the sensor 2 through another aperture of the object lens 3. Accordingly, the projected light flux L1 and the reflected light flux L2 deviate from a center of the optical axis of the object lens 3 and pass through the respective apertures.

In the near focus state shown in FIG. 1A, the light flux L1 projected to the object plane S deviates downward from the center of the optical axis. The reflected light flux L2 sensed by the sensor S2 further deviates from the center of the optical axis. In the far focus state shown in FIG. 1C, the deviation of the light flux is opposite to that in the near focus state. In the in-focus state shown in FIG. 1B, the light flux L1 is projected to the center of the optical axis of the object plane S, and the reflected light flux L2 returns to the center of the optical axis of the sensor 2.

Figure 2A:
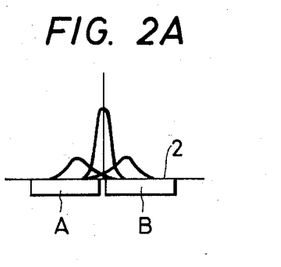
FIGS. 2A and 2B show a relation between a sensor and a light flux sensed thereby in an in-focus state, and a sensor output.

FIG. 2A shows an energy distribution of the reflected light flux L2 impinged to the photosensing plane of the sensor 2. In the near focus state or the far focus state, the reflected light flux L2 deviates into an area A or an area B divided by the center of the sensor 2. Accordingly, the near focus state and the far focus state can be discriminated by a polarity of a difference between signals in the area A and the area B and a zero-crossing point. In the in-focus state, the reflected light flux L2 equally distributes in the area A and the area B.

Figure 2B:
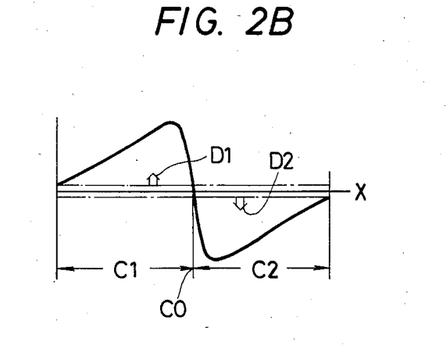

FIG. 2B shows a differential output of the area A and the area B. An X-axis represents a lens position, a Y-axis represents the differential output, C1 represents a near focus range, C0 represents an in-focus position, C2 represents a for focus range and arrows D1 and D2 represent detection detectable ranges.

Figure 3:
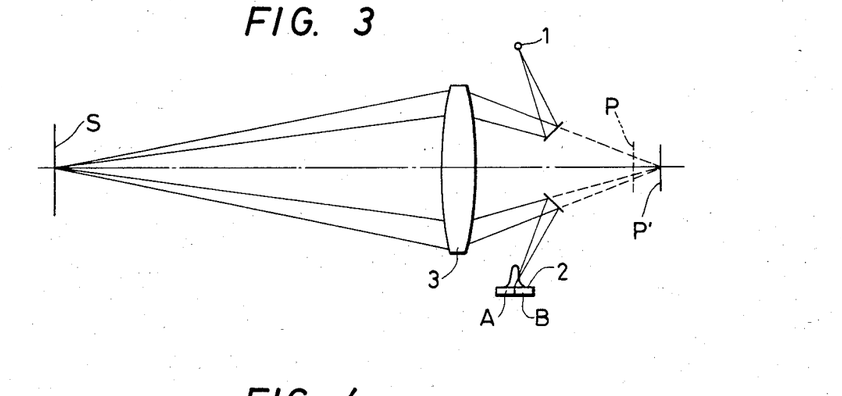
FIG. 3 illustrates an influence by a chromatic aberration caused by an exchange of an object lens.

The object lens 3 shown in FIG. 3 is usually connected for aberration such that the in-focus position for a visible light used for photographing or viewing is essentially constant, but the in-focus position for the near infrared light is not always constant but a relatively large infrared aberration is included. Thus, is a device having a fixed object lens, an influence by the infrared aberration can be practically eliminated by arranging the infrared light source, the object plane S and the center of the two-split sensor 2 in a conjugate relation when the photographing or viewing optical system is in the in-focus state. However, in the device having the exchangeable object lens, it is necessary to adjust the in-focus position because the residual infrared aberration varies substantially depending on a focal distance of the object lens and a focusing magnification.

For example, in a device shown in FIG. 3, if the in-focus position is set for an object lens and then the object lens is exchanged by another object lens 3, a difference is created between an anticipated focusing plane P of the photographing or viewing optical system and an actual focusing plane P' in the in-focus state of the lens. On the other hand, if the object lens 3 is set at the in-focus position of the photographing or viewing optical system, the in-focus state detection device produces a defocus state signal. Thus, when the object lens is exchanged, a reliability of the in-focus state detection is not satisfactory.

SUMMARY OF THE INVENTION

It is an object of the present invention to provide an in-focus state detection device which can exactly detect an in-focus state even when a chromatic aberration of an object lens changes.

It is another object of the present invention to provide an in-focus state detection device which can compensate the position of the in-focus point on the sensor varies according to a chromatic aberration of an object lens without moving a sensor.

Other objects of the present invention will be apparent from the following description of the invention.

DETAILED DESCRIPTION OF THE PREFERRED EMBODIMENTS

In the following embodiments, the portions not shown are identical to those shown in FIG. 1.

In the present invention, in order to resolve the above problems, chromatic aberration information of an object lens to an infrared light is supplied to an in-focus state detection system from an object lens mount or an object lens holder so that an in-focus position is corrected by mechanical, electrical or optical means based on the chromatic aberration information when the object lens is exchanged. A mechanism for transmitting the chromatic aberration information of the object lens to the in-focus state detection system has a pin for each object lens having a projection height thereof changed in accordance with the chromatic aberration information. When the object lens is mounted on a camera, a slidable resistance arranged near a lens mount is slid by the pin in accordance with the projection height of the pin so that desired chromatic aberration information is generated.

Figure 4:
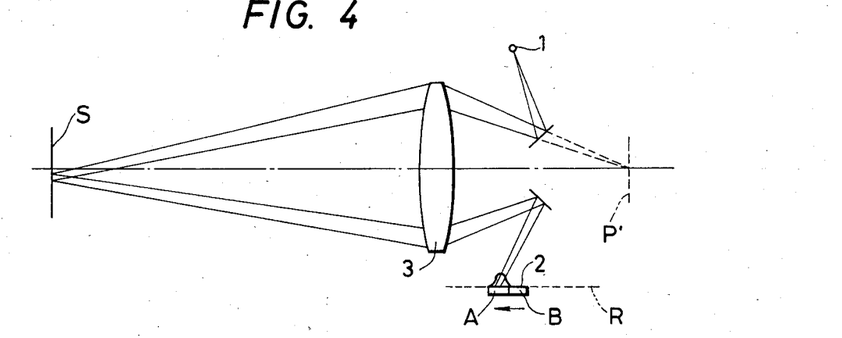
FIG. 4 shows an embodiment of the present invention.

In FIG. 4, the sensor 2 is mechanically moved, as the object lens 3 is exchanged, in a direction of an arrow, that is, in a direction of movement of the light flux on the photosensing plane R of the sensor 2 in accordance with the focusing state of the object lens 3. In the present embodiment, the in-focus state discrimination point of the sensor 2, that is, a boundary of the photosensing area A and the photo-sensing area B of the sensor 2 is mechanically adjusted.

Figure 5A:
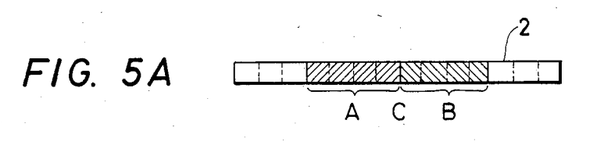
FIGS. 5A and 5B show another embodiment of the present invention.
Figure 5B:
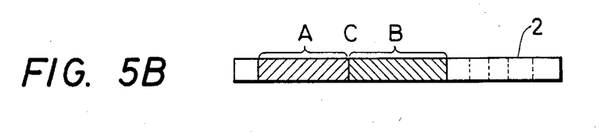

In a device which is not suitable to move the sensor 2 as is done in the embodiment of FIG. 4, a CCD line sensor having a number of pixels as shown in FIG. 5 is used as the sensor 2 and the areas A and B and the in-focus state discrimination point C is electrically set from those shown in FIG. 5A to those shown in FIG. 5B as the object lens 3 is exchanged. In this manner, the same effect as that in moving the sensor 2 is attained. In this case, it is assumed that the number of pixels in each of the area A and B is constant and sums of outputs of the pixels in the areas A and B are used as the outputs of the areas A and B, respectively. A control circuit will be explained hereinafter with reference to FIG. 9.

Figure 6A:
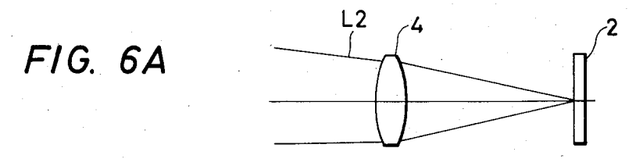
FIGS. 6A, 6B and 6C show another embodiment of the present invention.
Figures 6B, 6C:
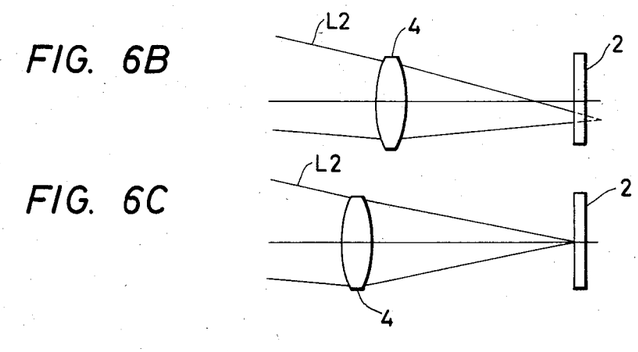

As shown in FIG. 6, a lens 4 may be arranged in front of the sensor 2 and the lens 4 may be moved to correct a relation between the incident light flux to the sensor 2 and the in-focus state discrimination point. Assuming that FIG. 6A shows a condition when one object lens is in an in-focus state, a focusing point of the light flux when another object lens is used deviates as shown in FIG. 6B. Accordingly, the lens 4 is moved to correct the relation between the light flux to the sensor 2 and the in-focus state discrimination point. The same effect can be attained by using a variable focal distance lens such as a zoom lens.

Figure 7A:
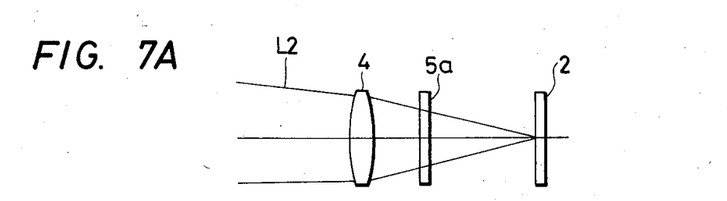
FIGS. 7A, 7B and 7C show another embodiment of the present invention, FIG. 8 show another embodiment of the present invention applied to a microscope.
Figure 7B:
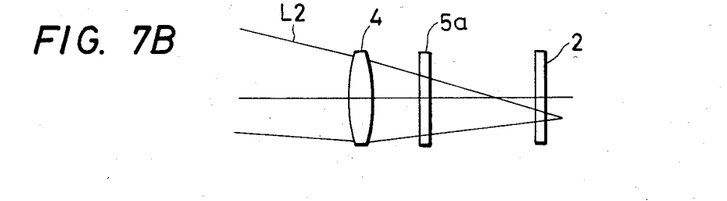
Figure 7C:
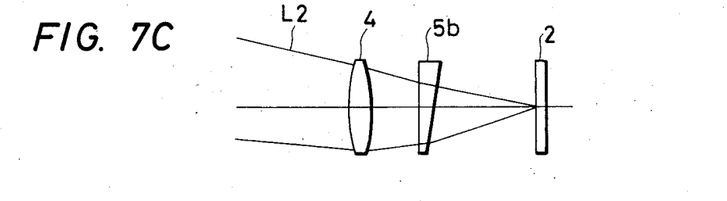

As shown in FIG. 7, a selected prism having a small angle may be inserted in an optical path of the incident light to deflect the light flux L2 in order to correct the in-focus state discrimination point. Assuming that FIG. 7A shows a condition when one object lens is used, the focusing point of the light flux L2 in the in-focus state deviates as shown in FIG. 7B when another object lens is used. Accordingly, the prism 5a is exchanged by a prism 5b so that the in-focus state discrimination point is corrected as shown in FIG. 7C.

In the above embodiments, the incident light system is adjusted by the mechanical, electrical or optical correction means to correct the in-focus state discrimination point. It is advisable to effect similar correction for the projection light system.

Figure 8:
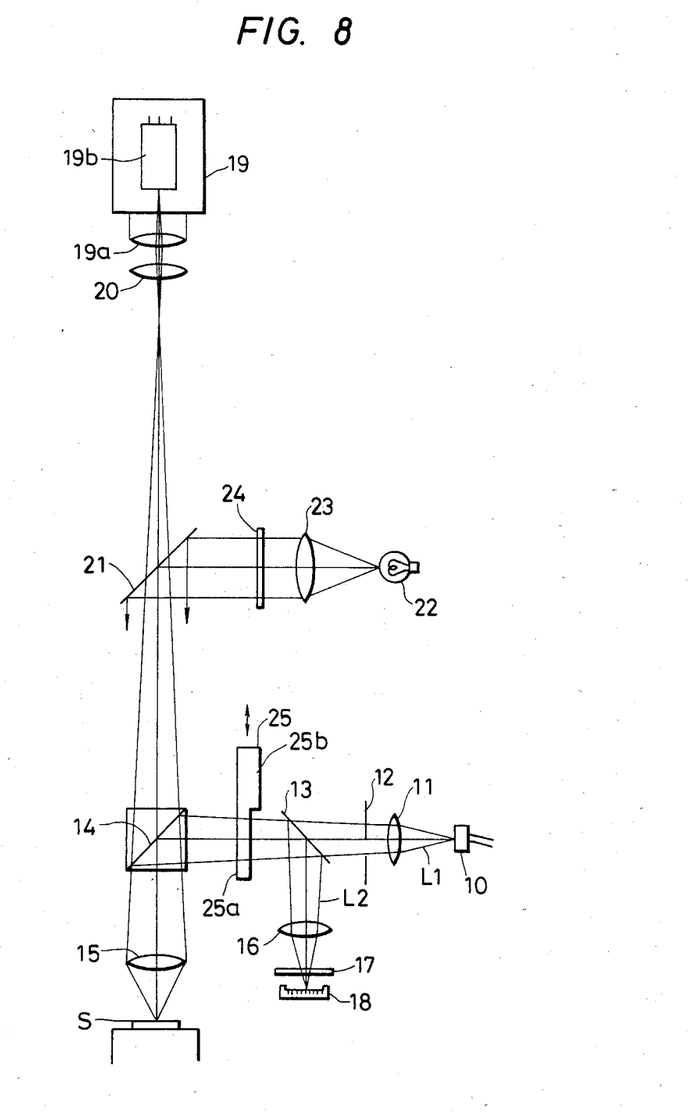

FIG. 8 shows an embodiment applied to a microscope in which the projection light system and the incident light system are corrected. A light source 10 may be a semiconductor laser, and a projecting light flux L1 emanated therefrom is projected to an object plane S through a projection lens 11, a mask 12, beam splitters 13 and 14 and an object lens 15, and a light flux L2 reflected by the object plane S is sensed by a sensor 18 through the object lens 15, the beam splitters 14 and 13, a lens 16 and an external light elimination filter 17. Numeral 19 denotes a television camera, numeral 19a denotes an imaging lens thereof, numeral 19b denotes an imaging device, numeral 20 denotes an eye lens, numeral 21 denotes a half-mirror, numeral 22 denotes an illumination light source, numberal 23 denotes a condenser lens and numeral 24 denotes an infrared-cut filter.

When the projection light system and the incident light system have a common partial optical path, a transparent parallel plate 25 having two or more areas 25a and 25b having different optical path lengths in selectively inserted in a non-focal portion in the common optical path as the object lens 15 is exchanged so that the in-focus state discrimination point is corrected.

In FIG. 8, the parallel plate 25 is exchangeably inserted between the beam splitters 13 and 14. Instead of the parallel plate 25, a lens movable in the direction of the optical axis may be used or it may be substituted by a variable focal length lens.

Figure 9:
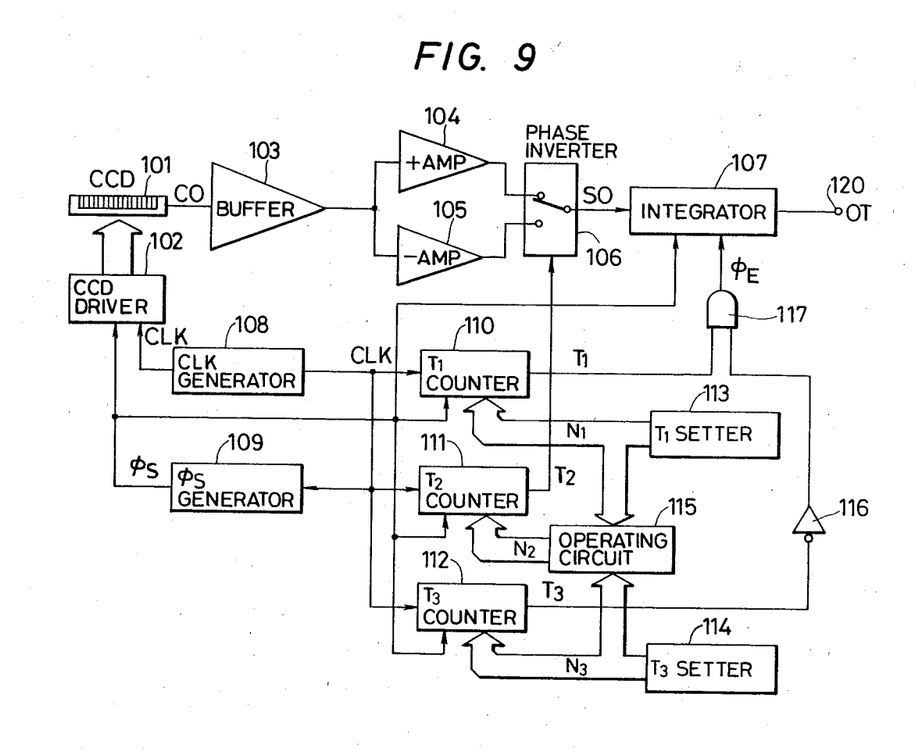
FIG. 9 shows a control circuit in the embodiment of FIG. 5.

FIG. 9 shows a control circuit in the embodiment of FIG. 5. Numeral 101 denotes a CCD of the sensor 2, numeral 102 denotes a CCD driver, numeral 103 denotes a buffer for sequentially receiving pixel information serially supplied from the CCD 101, numeral 104 denotes an operational amplifier for amplifying the output of the buffer 103 by a factor of +A, numeral 105 denotes an operational amplifier for amplifying the output of the buffer 103 by a factor of −A, numeral 106 denotes an analog switch for gating the output of the amplifier 104 or 105 at a predetermined timing, numeral 107 denotes an integrator for integrating the output gated by the switch 106 for a duration of a pulse $\phi_E$, numeral 108 denotes a clock generator for generating a reference clock, numeral 109 denotes a $\phi_S$ generator for generating a pulse $\phi_S$ to start the output of the pixel information from the CCD 101 and reset the integrator 107, numeral 110 denotes a $T_1$ counter for measuring a time period $t_1$ from the generation of the pulse $\phi_s$ by counting the clock CLK starting from the generation of the pulse $\phi_S$, numeral 111 denotes a $T_2$ counter for measuring a time period $t_2$ from the generation of the pulse $\phi_2$ by counting the clock CLK starting from the generation of the pulse $\phi_S$, and numeral 112 denotes a $T_3$ counter for measuring a time period $t_2$ from the generation of the pulse $\phi_3$ by counting the clock CLK starting from the generation of the pulse $\phi_3$.

Numeral 113 denotes a $T_1$ setter for setting a count data $N_1$ in the $T_1$ counter 110 to measure the time period $t_1$, and numeral 114 denotes a $T_3$ setter for setting a count data $N_3$ in the $T_3$ counter for measuring the time period $t_3$. The setters 113 and 114 vary the data $N_1$ and $N_3$ to be set in the $T_1$ counter 110 and the $T_3$ counter 112 in accordance with the chromatic aberration information of the object lens 3. Numeral 115 denotes an operating circuit summing the output data $N_1$ of the $T_1$ setter 113 and the output data $N_3$ of the $T_3$ setter 114 and dividing the sum by two to supply a data $N_2=(N_1+N_3)/2$ to the $T_2$ 2 counter. Numeral 116 denotes an inverter for inverting the output $T_3$ of the $T_3$ counter and numeral 117 denotes an AND gate which ANDs the output $T_1$ of the $T_1$ counter 110 and the output $\overline{T_3}$ of the inverter 116. It produces an output $\phi_E$ when both $T_1$ and $\overline{T_3}$ are high. During the duration of the output $\phi_E$, the integrator 107 integrates the input, and produces an integrated output at a terminal 120. CLK denotes a reference clock, $\phi_S$ denotes the pulse for controlling the start of transfer of the CCD 101, the reset of the integrator 107 and the start of countings of the $T_1$ counter 110, $T_2$ counter 111 and $T_3$ counter 112, $T_1$ denotes a timing signal to start the integration by the integrator 107, $T_2$ denotes a timing signal to switch the switch 106, $T_3$ denotes a timing signal to terminate the integration by the integrator 107, $\phi_E$ denotes an AND function signal of $T_1$ and $\overline{T_3}$, CO denotes the output of the CCD 101, SO denotes the output of the switch 106, and OUT denotes the output of the integrator 107.

Figure 10:
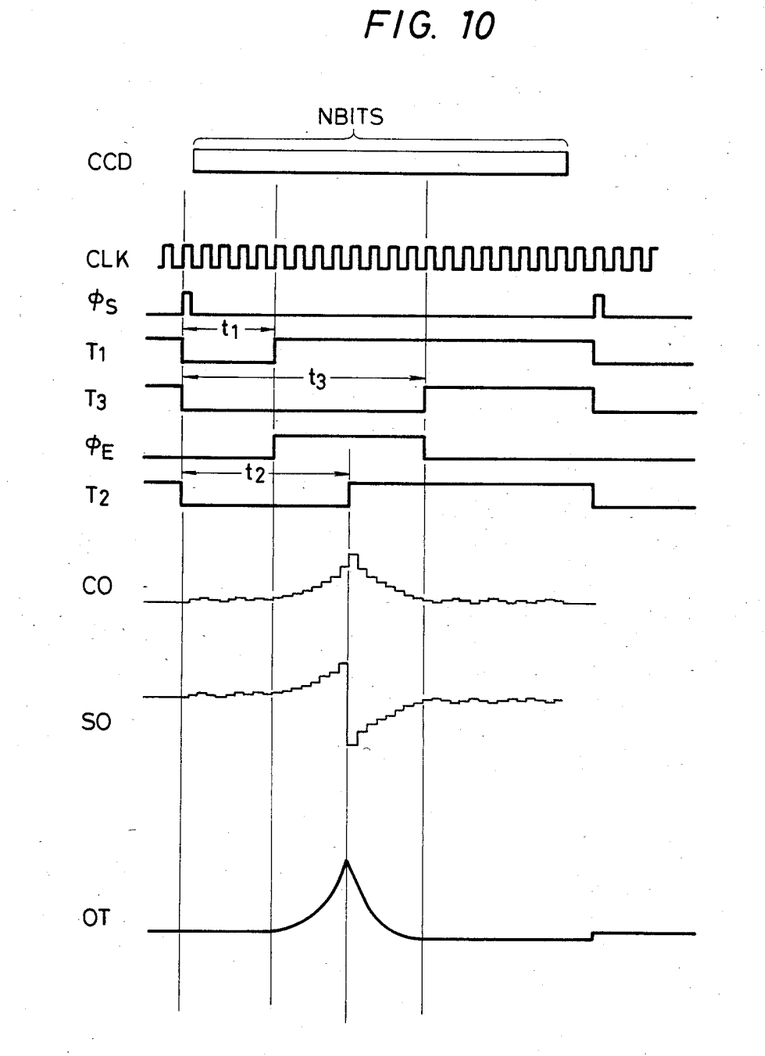
FIG. 10 shows a timing chart of the control circuit of FIG. 9.

The operation of the circuit of FIG. 9 is explained with reference to a timing chart of FIG. 10. When the $\phi_S$ generator 109 generates the pulse $\phi_S$ while the CLK generator 108 generates the clock CLK, the N-bit CCD 101 serially produces the pixel information as the CCD output CO, the integrator 107 is reset and the counters 110, 111 and 112 start to count the clock CLK. The output CO of the CCD 101 is supplied to the amplifiers 104 and 105 through the buffer 103 so that it is amplified by factors of $-A$ and $+A$, respectively. Immediately after the generation of $\phi_S$, the output $T_2$ of the counter 111 is low and the switch 106 is in the position shown in FIG. 9. Accordingly, the output of the amplifier 104 is supplied to the integrator 107 as SO. Since $\phi_E$ is now low, the integration is not carried out. The time $t_1$ after the generation of $\phi_S$, the output $T_1$ of the counter 110 changes to high level and the AND gate 117 produces $\phi_E$. At this moment, the integrator 107 starts to integrate the output SO. At this moment, the output $T_3$ of the $T_3$ counter 112 is low and the output of the inverter 116 is high.

The time $t_2$ ($=(t_1+t_3)/2$) after the generation of $\phi_S$, the output $T_2$ of the $T_2$ counter 111 changes to high level and the switch 106 connects the amplifier 105 to the integrator 107. Thus, the boundary C of the area A and the area B of the sensor in FIG. 5 is determined by the output $T_2$. As seen from the above explanation, the integrated value in the integrator 107 between the time $t_1$ and the time $t_2$ is the output for the area A.

From the time $t_2$, the integrator 107 starts to integrate the output CO of the CCD 101 inverted and amplified by the amplifier 105. It is opposite to the integration polarity before the time $t_2$. The time $t_3$ after the generation of $\phi_S$, the output $T_3$ of the $T_3$ counter 112 changes to high level and the output of the inverter 116 changes to low level. Accordingly, the AND gate 117 no longer produces the output $\phi_E$. Thus, the integrator 107 stop the integration. At this moment, a signal representing the difference between the outputs of the areas A and B in the sensor of FIG. 5 is produced at the terminal 120. This signal is held in the integrator 107 until the pulse $\phi_3$ is again generated.

The $T_1$ setter 113 and the $T_3$ setter 114 may be ones which mechanically vary the data $N_1$ and $N_3$ when the object lens 3 is mounted, or which electrically change the data $N_1$ and $N_3$ by a microprocessor. The operating circuit 115 has a summing circuit for digitally adding $N_1$ and $N_3$ and a circuit for shifting binary outputs $b_m, b_{m-1}, \ldots b_2, b_1, b_0$ of the sum by one bit lower relative to input bits $b_n', b_{n-1}', \ldots b_2', b_1', b_0'$ of the counter 111, for example, by connecting $b_1$ to $b_0'$ so that the sum is divided by a factor of two.

As described hereinabove, in accordance with the in-focus state detection device of the present invention, the deviation between the in-focus position for the visible light and the in-focus state discrimination point for the infrared light for the in-focus state detection can be eliminated even when the device is applied to the optical system having the exchangeable object lens. Accordingly, a highly reliable in-focus state detection is attained.

What we claim is:

1. An in-focus state detection device for detecting an in-focus state of an object lens, comprising:
   light generating means for generating a detection light;
   projection means for projecting said detection light on said object through a first aperture of said objective lens;
   sensing means having a first and a second area for producing a signal concerning the light intensity balance between said two areas, said signal indicating a focusing state of said objective lens;
   guiding means for guiding the detection light reflected from said object into said sensing means through second aperture of said objective lens different from said first aperture; and
   correction means for moving the boundary between said first and second areas in a direction perpendicular to an optical axis of said objective lens in accordance with a chromatic aberration information of said objective lens to correct the detection error.

2. An in-focus state detection device according to claim 1 wherein said correction means is disposed between the object lens and said sensing means.

3. An in-focus state detection device according to claim 2 wherein said correction means includes a lens.

4. An in-focus state detection device according to claim 2 wherein said correction means includes a prism.

5. An in-focus state detection device according to claim 2, wherein said correction means moves the sensing means thereby to move the boundary.

6. An in-focus state detection device for detecting an in-focus state of an object lens, comprising:
   light emitting means;
   sensing means for producing a signal for detecting the in-focus state of the object lens by sensing the light emitted from said light emitting means and reflected by an object, through the object lens;
   said sensing means having a plurality of pixels; and
   correction means for correcting the output of said sensing means by selecting the pixels used for said sensing means in accordance with a change in a chromatic aberration of the object lens.

7. An in-focus state detection device according to claim 6, wherein said sensing means serially produces pixel information.

8. An in-focus state detection device according to claim 7, wherein said correction means includes a first timer for generating a first signal a first time period after start of output by said sensing means and a second timer for generating a second signal a second time period after the start of output by said sensing means.

9. in-focus state detection device according to claim 8, wherein said correction means validates the information outputted by said sensing means for a period from said first signal to said second signal.

10. An in-focus state detection device according to claim 9, wherein said correction means includes a third timer for generating a third signal at a third time between said first time and said second time.

11. An in-focus state detection device according to claim 10 said correction means includes operating means for calculating a difference between a summation of the pixel information outputted by said sensing means between said first signal and said second signal and a summation of the pixel information outputted by said sensing means between said second signal and said third signal.

12. An in-focus state detection device according to claim 11, wherein the period between said first signal and said second signal and the period between said second signal and said third signal are equal.

13. An in-focus state detection device according to claim 12, wherein said operating means includes first and second amplifiers for amplifying the pixel information from said sensing means in opposite polarities to each other, an integrator and a switch for switching the connection of said integrator from said first amplifier to said second amplifier in response to said third signal.

14. in-focus state detection device according to claim 13 wherein integration by said integrator is controlled by said first and second signals.

15. An in-focus state detection device according to claim 14, wherein said integrator starts the integration in response to said first signal and stops the integration in response to said second signal.

16. An in-focus state detection device according to claim 15, wherein said first and second times change the output timings in accordance with the change in the chromatic aberration of the object lens.

17. An in-focus state detection device for detecting an in-focus state of an object lens, comprising:
light emitting means;
sensing means for producing a signal for detecting the in-focus state of the object lens by sensing the light emitted by said light emitting means and reflected by an object, through the object lens; and
correction means for moving said sensing means along a photosensing plane in accordance with a change in a chromatic aberration of the object lens to correct a relation between the light impinged to said sensing means and a photosensing plane of said sensing means.

18. An in-focus state detection device according to claim 17, wherein said sensing means has a plurality of photosensing areas and said correction means moves said sensing means such that the light in the in-focus state impinges to a vicinity of a boundary of the photosensing areas.

* * * * *